US006831592B2

(12) United States Patent
Perry

(10) Patent No.: US 6,831,592 B2
(45) Date of Patent: Dec. 14, 2004

(54) NEAR-VERTICAL INCIDENCE HF RADAR

(75) Inventor: Kenneth H Perry, Maldon (GB)

(73) Assignee: Alenia Marconi Systems Limited, Essex (GB)

( * ) Notice: Subject to any disclaimer, the term of this patent is extended or adjusted under 35 U.S.C. 154(b) by 0 days.

(21) Appl. No.: 10/332,273

(22) PCT Filed: Jul. 17, 2001

(86) PCT No.: PCT/GB01/03206

§ 371 (c)(1),
(2), (4) Date: Jan. 7, 2003

(87) PCT Pub. No.: WO02/08785

PCT Pub. Date: Jan. 31, 2002

(65) Prior Publication Data

US 2003/0156056 A1 Aug. 21, 2003

(30) Foreign Application Priority Data

Jul. 26, 2000 (GB) .............................................. 0018170

(51) Int. Cl.[7] .............................. G01S 7/28; G01S 7/35; G01S 7/40; G01S 13/00
(52) U.S. Cl. .............................. 342/82; 342/26; 342/59; 342/89; 342/98; 342/159; 342/165; 342/173; 342/175; 342/195; 375/295; 375/316; 375/346; 455/62; 455/67.11
(58) Field of Search ................................ 375/295, 296, 375/309, 314, 316, 346, 347–352; 342/165–174, 159, 22, 26, 27, 28, 59, 82, 83–103, 175, 188, 189–197, 25; 455/63.1–63.4, 64, 65, 67.11–67.16, 62

(56) References Cited

U.S. PATENT DOCUMENTS 3,881,154 A * 4/1975 Lewis et al. ................... 342/26
4,011,565 A * 3/1977 Toman ........................ 342/26

(List continued on next page.)

FOREIGN PATENT DOCUMENTS

EP        0022410 A1  *  1/1981  .......... G01S/13/95
WO      WO 95/29411 A1     11/1995
WO      WO-95/29412 A1     11/1995

OTHER PUBLICATIONS

Ferraro, E.et al.; "Cold War to Counter Drug"; *Microwave Journal*, Horizon House, Dedham, U.S.; vol. 41, No. 3; Mar. 1, 1998; pp 82, 84, 86, 88 (XP000781155).

Ciboci, J.W.; "Over–the–Horizon Radar Surveillance of Airfields for Counterdrug Applications"; *Proceedings of the 1997 IEEE National Radar Conference*; Syracuse, New York; May 13, 1997, pp 178–181; (XP000697867).

(List continued on next page.)

*Primary Examiner*—Bernarr E. Gregory
(74) *Attorney, Agent, or Firm*—Nixon & Vanderhye P.C.

(57) ABSTRACT

An HF radar system comprises a transmitting system, a receiving system, a signal processing system and a frequency management/ionospheric sounding system. The transmitting system comprises a transmitting antenna array configured to transmit a beam in a near vertical direction and a transmitting device arranged to drive the transmitting antenna array at frequencies suitable for downward refraction by the ionosphere. The receiving system comprises a receiving antenna array configured to receive returning signals from a target area returning to the receiving antenna array via refraction at the ionosphere. The signal processing system comprises a digital data processing system. The frequency management/sounding system comprises cooperating transmitting and receiving systems sending HF signals to the ionosphere and analysing the returning signals. Alternatively, the system may have a duplexed antenna array. The receiving system includes means to discriminate the returning signal produced by a helicopter, other aircraft or surface vessels.

10 Claims, 4 Drawing Sheets

U.S. PATENT DOCUMENTS

| | | | | |
|---|---|---|---|---|
| 4,356,487 A | * | 10/1982 | Herbreteau | 342/26 |
| 4,463,357 A | * | 7/1984 | MacDoran | 342/26 |
| 4,554,546 A | * | 11/1985 | Herbreteau et al. | 342/26 |
| 5,160,932 A | * | 11/1992 | Bull | 342/25 |
| 5,230,076 A | * | 7/1993 | Wilkinson | 455/62 |
| 5,990,822 A | * | 11/1999 | Honigsbaum | 342/90 |
| 6,222,479 B1 | * | 4/2001 | Honigsbaum | 342/90 |
| 6,243,037 B1 | * | 6/2001 | Pulford et al. | 342/95 |

OTHER PUBLICATIONS

Basler, R. P.; "Oth Radar System Design"; *Proceedings of the 1997 IEEE National Radar Conference*; Syracuse, New York; May 13, 1997; pp 223–226; (XP000697867).

Clancy, J.T. et al.; "Mitigation of Range Folded Clutter by a Nonrecurrent Waveform"; *Record of the 1999 IEEE Radar Conference*; Waltham, MA.; Apr. 20–22, 1999; pp 79–83; (XP000895726).

* cited by examiner

Sky radar

- Relies on complex refraction by ionosphere
- Very long range – out to 3000kms+
- Radar is blind in the range 0-600kms

NEAR-VERTICAL INCIDENCE HF RADAR

This application is the U.S. national phase of international application PCT/GB01/03206, filed in English on 17 Jul. 2001 which designated the U.S. PCT/GB01/03206 claims priority to GB Application No. 0018170.1 filed 26 Jul. 2000. The entire contents of these applications are incorporated herein by references.

The present invention relates to a use of HF Radar. It particularly relates to HF Radar installations consisting of arrays of receiving and transmitting antennas configured to produce near-vertical incidence of radiation paths to and from the ionosphere overhead to illuminate a land or sea area near to the antennas with horizontally polarised radiation, HF Radar being normally specified to be in the frequency range of 2–30 MHz.

As depicted in FIG. 1, whereas microwave radar is generally limited to line-of-sight surveillance, HF Surfacewave Radar allows 'over-the-horizon' surveillance to be made. This is due to electromagnetic waves at HF having the important property of being refracted by the ionosphere so as to return to earth. As depicted in FIG. 2, HF Skywave Radar also allows 'over-the-horizon' surveillance but with the constraint that detections cannot be made at distances less than some 600 km, the so-called "skip distance".

It is the practice to transmit vertically polarised signals in HF Surfacewave Radar to achieve coupling to the conducting surface of the sea. Vertical polarisation is also used for HF Skywave radar for ease of antenna construction.

Where the radar target is a helicopter, the Skywave form of HF Radar is known to obtain detections due to the downward signal from the ionosphere being reflected from the rotating blades (the downward signal is horizontally polarised due to the refraction mechanisms at the ionosphere). The reflections from the multiple blade rotor rotation result in a characteristic, identifiable modulation of the HF Radar signal.

Where detections by microwave radar of targets such as helicopters, other aircraft or surface vessels are to be made at short distances from the radar, typically 20 km to 150 km, intervening topography such as mountainous terrain, may prohibit 'above-the-horizon' radar detection.

Lack of sea in the foreground could prohibit HF Surfacewave 'below-horizon' detection, also its obligatory vertical polarisation is not in the horizontal plane which is required for optimal reflection from the rotating near horizontal rotor blades of helicopters; the minimum skip-distance criterion will prohibit detection by conventional HF Skywave transmission. In these cases recourse could be made to surveillance over-flights of the target area by rotary or fixed wing aircraft or by satellite borne sensors.

For operational reasons, or if the target is stealthy to microwave detection, these detection methods may be limited in application. In particular, a slow-moving, low-flying helicopter would be difficult to detect when shielded by terrain or where the background produces radar clutter.

In order to produce a response from the rotor blades of a low-flying helicopter with horizontally polarised energy in the HF radio band, the mode of transmission and reception called Near-Vertical Incidence Skywave (NVIS) will be utilised, where horizontally polarised radiation is launched from a suitably configured HF transmitting antenna array in directions lying within an inverted cone of some 30°-apex angle. By suitable choices of radiated frequency within the HF band, downward refraction can be achieved over a significant part of the 24-hour diurnal sun cycle (the sun's radiation causes the necessary ionisation for producing this refraction).

The downward-travelling signal illuminates the earth's surface together with targets including ships and aircraft moving over it. Back-scattered returns from these will travel upwards in a similar path direction which will allow a further refraction at the ionosphere causing the signal to travel down again to the vicinity of the transmitting site. Normally, near to the transmitting antenna array is located a horizontally polarised upwardly-directed receiving antenna array for intercepting the returns from the illuminated target area.

The present invention provides an arrangement whereby the disadvantages of the prior art are overcome by obtaining returns from targets which may be hidden from normal sensors by mountainous terrain, steep-sided fjords, by below-the-horizon limitations, or where the target may be stealthy (with reduced visibility) to microwave radar.

According to the present invention there is provided an HF radar system comprising a transmitting system, a receiving system, a signal processing system and a frequency management/ionospheric sounding system;

the transmitting system comprising a transmitting antenna array configured to transmit a beam in a near vertical direction and a transmitting device arranged to drive the transmitting antenna array at frequencies suitable for downward refraction by the ionosphere;
the receiving system comprising a receiving antenna array configured to receive returning signals from a target area returning to the receiving antenna array via refraction at the ionosphere;
the signal processing system comprising a digital data processing system;
the frequency management/sounding system comprising a cooperating transmitting system and receiving system sending HF signals to the ionosphere and analysing the returning signals.

The receiving system includes means to discriminate a returning signal from a helicopter.

Alternatively, according to the present invention there is provided an HF radar system comprising a duplexed antenna array, a transmitting system, a receiving system, a signal processing system and a frequency management/ionospheric sounding system;

the duplexed antenna array comprising a composite directional transmitting and receiving antenna array connected to a duplexer and configured to transmit a beam in a near vertical direction and to receive returning signals from a target area returning to the composite transmitting and receiving antenna array via refraction at the ionosphere;
the transmitting system comprising a transmitting device being connected via the duplexer to and arranged to drive the composite directional transmitting and receiving antenna array at frequencies suitable for downward refraction by the ionosphere;
the receiving system being connected to the duplexer and being configured to receive returning signals from the target area returning to the receiving antenna array via refraction at the ionosphere;
the signal processing system comprising a digital data processing system;
the frequency management/sounding system comprising a cooperating transmitting system and receiving system sending HF signals to the ionosphere and analysing the returning signals.

The present invention will now be described, by way of example, with reference to the accompanying drawings, in which.

Figure 1:
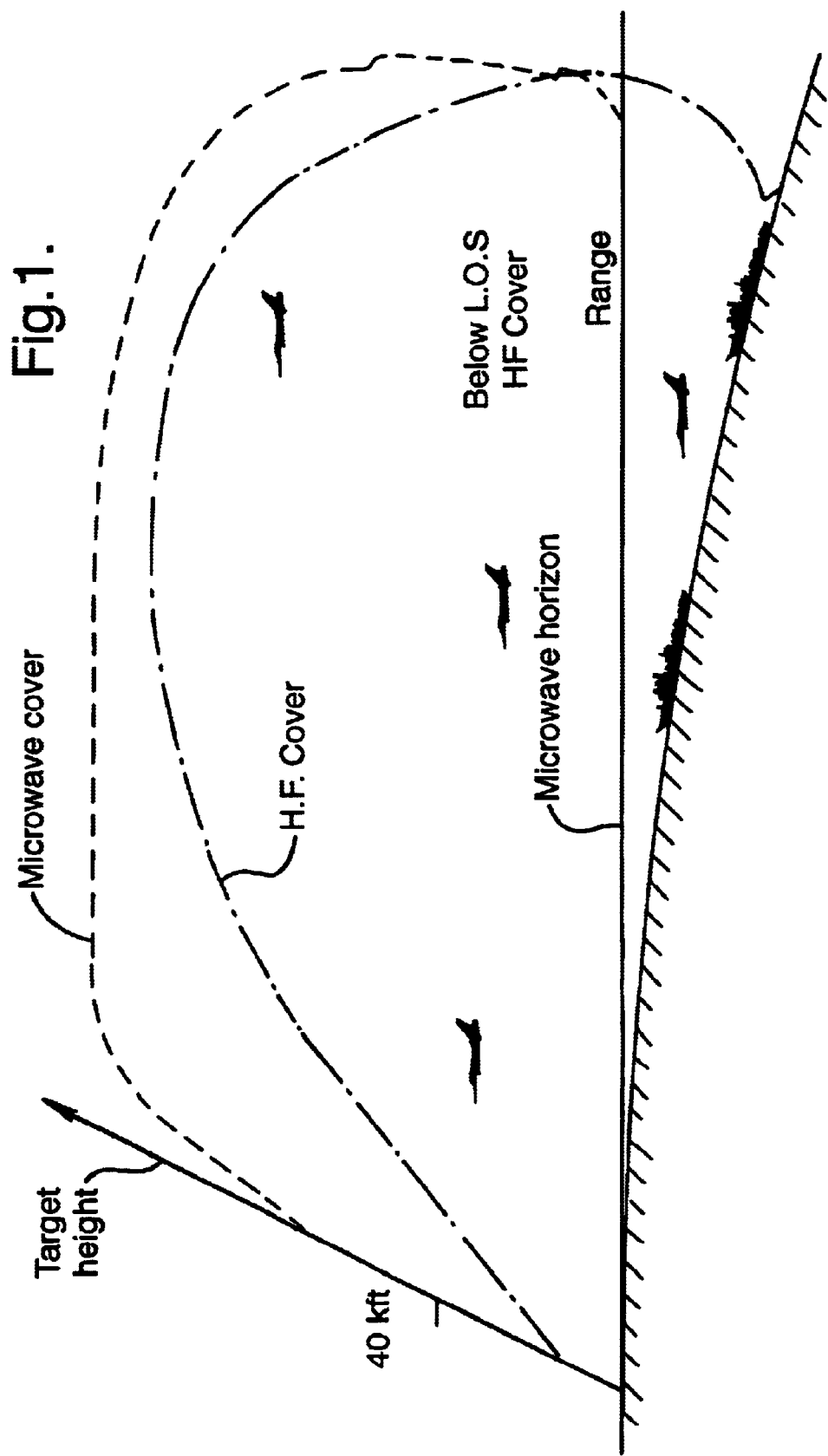
FIG. 1 shows the typical surveillance range of HF Surfacewave Radar.
Figure 2:
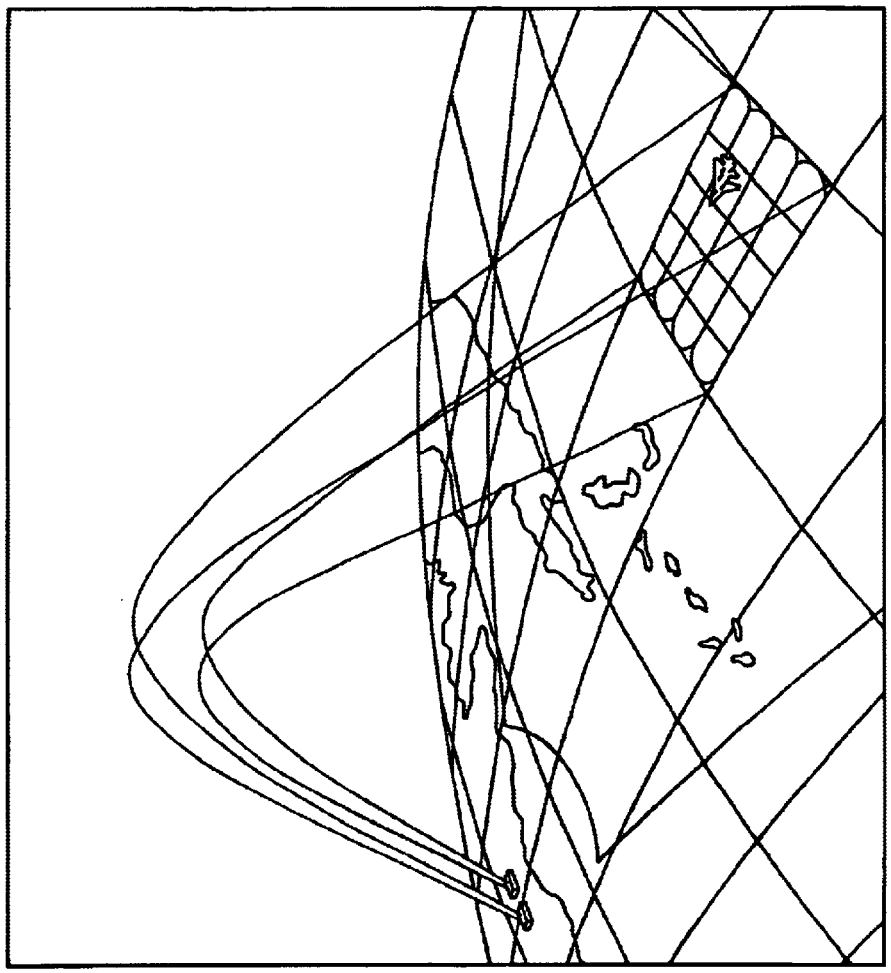
FIG. 2 shows the typical surveillance range of HF Sky-wave Radar.
Figure 3:
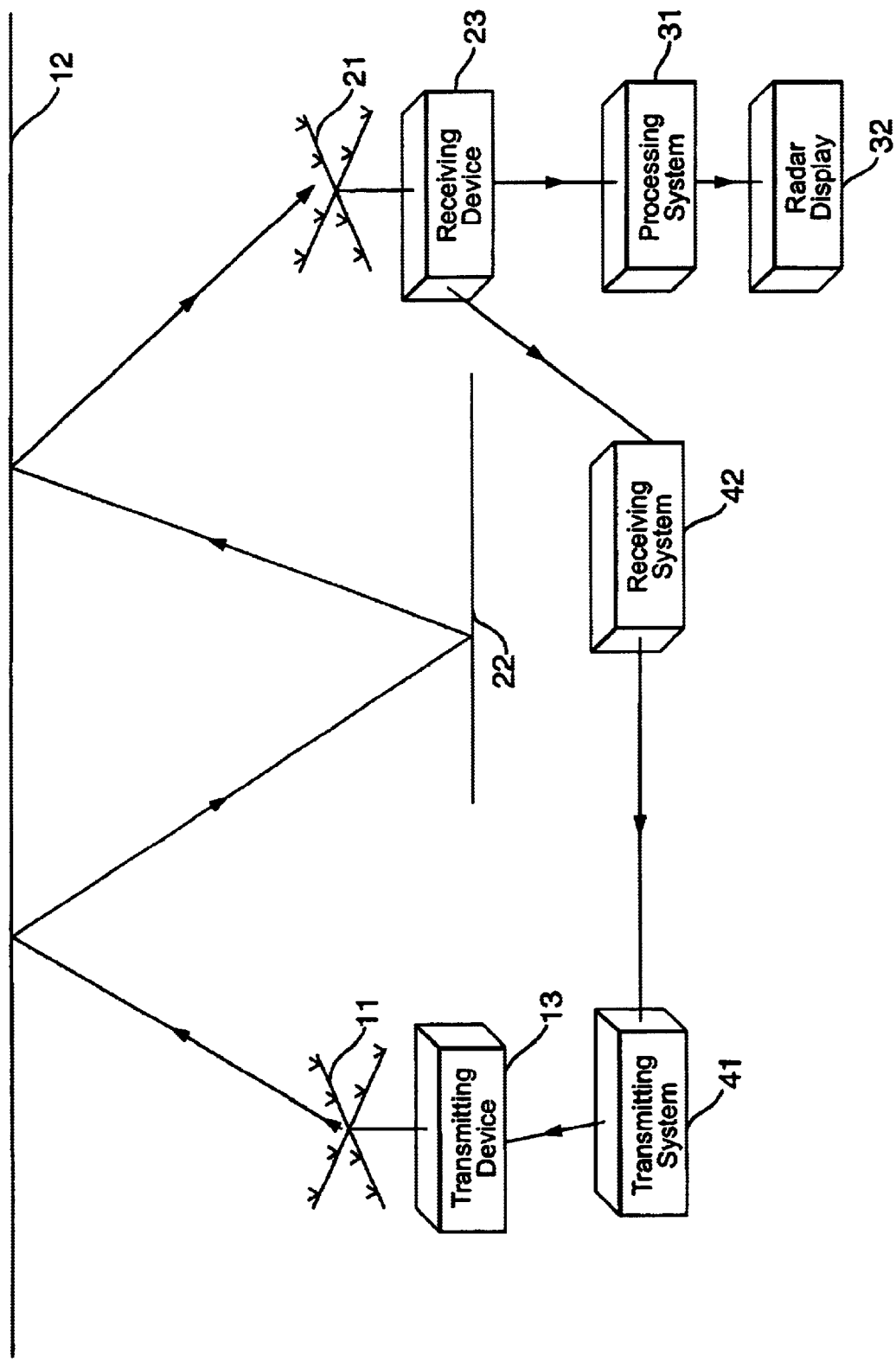
FIG. 3 shows a block diagram of an example of an NVIS Radar according to the present invention.

As shown in FIG. 3, the radar system comprises:

a transmitting system, a receiving system, a signal processing system, and a frequency management/ionospheric sounding system, which frequency management/ionospheric sounding system can be part of the present radar system with which it may be used on a time-shared basis.

The transmitting system comprises:

a directional antenna array 11, configured to transmit a beam in near vertical directions for illumination of a section of the overhead ionosphere 12.

a transmitting device 13 which will drive the above mentioned array 11 at frequencies which are suitable for almost total downward refraction from the ionosphere 12 and carry modulation appropriate to discrimination of targets at a target area 22, from background radio noise and land, sea and ionospheric clutter at a target area 22;

The receiving system comprises:

a directional receiving antenna array 21 configured and directed to receive signals scattered from the target area 22 and returning to the location of the receiving antenna array 21 by refraction at the ionosphere 12 overhead;

a receiving device 23 with conversion means for conversion of the signals received by the receiving antenna 21 into a digital stream carrying electrical descriptors of targets detected in the ground illumination foot-print, also of clutter and noise signals.

The signal processing system comprises:

a digital data processing system 31, which allows discrimination of the characteristic returns from the target, and in particular discrimination of returns modulated by the motion of the multiple rotor blades of a helicopter, from the returns due to land, to the sea, and to the varying ionosphere 12. The processed signals are then further converted for presentation on a radar display 32.

The frequency management/sounding system comprises:

a transmitting system 41 and a receiving system 42 which operate together, to send HF signals to the ionosphere 13, and analyse those signals upon return to earth, to provide information on the height of the refracting ionosphere 13 layer above the earth, the area distribution of the layer and the optimum frequencies for this 2-way signal path.

The target area 13 will be typically an annular area having 20 Km inner radius and 150 Km outer radius.

Figure 4:
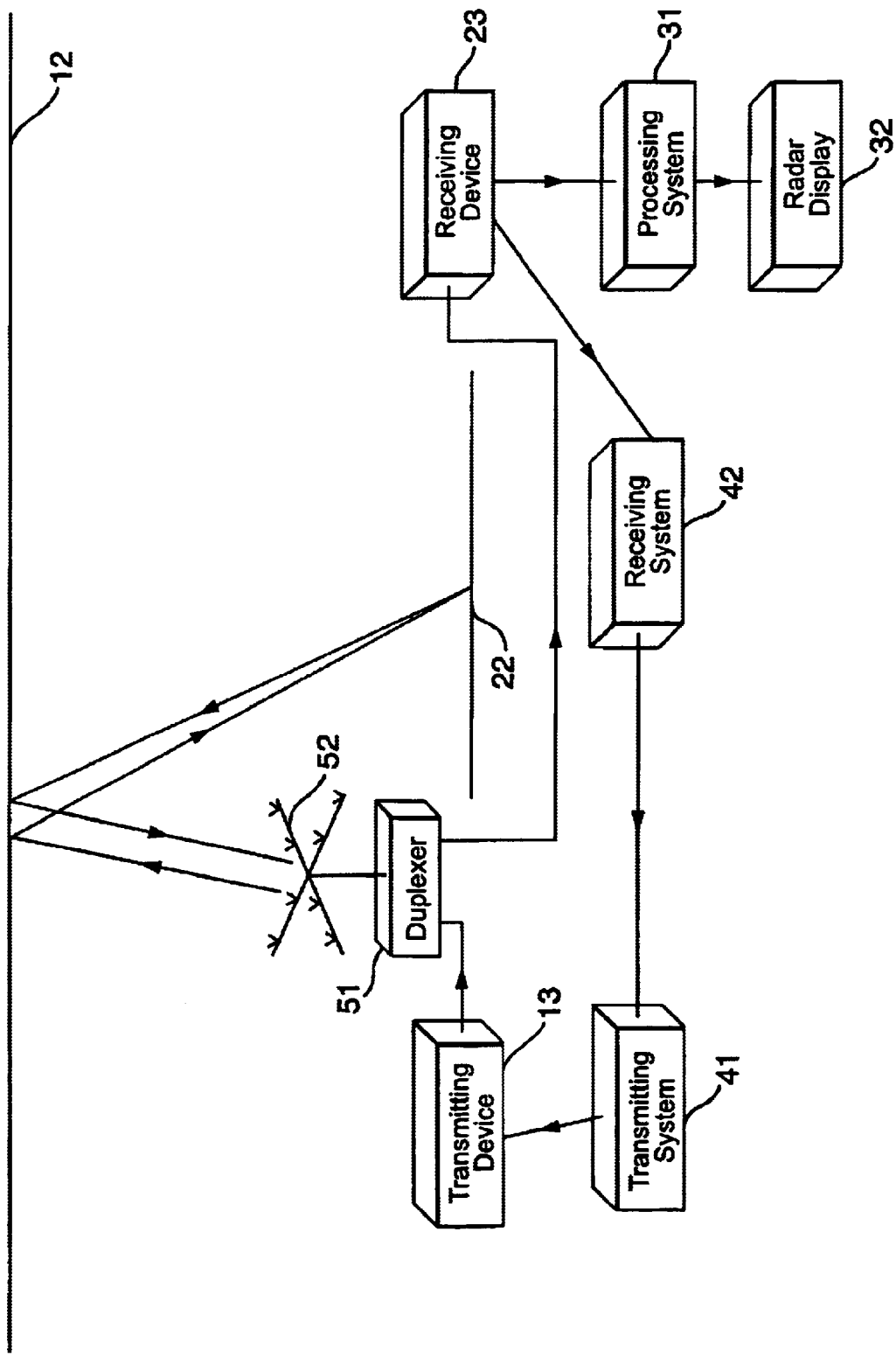
FIG. 4 shows a block diagram of an example of an NVIS Radar according to the present invention including an antenna duplexer.

As shown in FIG. 4, rather than having separate transmitting and receiving antenna arrays 11, 21, the transmitting device 13 and the receiving device 23 may be connected to an antenna duplexer 51 having a common directional transmitting and receiving antenna 52.

What is claimed is:

1. An HF radar system comprising:

a transmitting system comprising a directional transmitting antenna array configured to transmit a beam in an upward direction and a transmitting device arranged to drive the transmitting antenna array at frequencies suitable for downward refraction by the ionosphere;

a receiving system comprising a directional receiving antenna array configured to receive returning signals reflected from a target area returning to the receiving antenna array via refraction at the ionosphere;

a signal processing system comprising a digital data processing system; and a frequency management and ionospheric sounding system, said sounding system comprising a cooperating transmitting system and receiving system sending HF signals to the ionosphere and analysing the returning signals.

2. An HF radar system as claimed in claim 1, wherein the transmitting device provides modulation to enable the discrimination of targets from background noise and land, sea and ionospheric clutter.

3. An HF radar system as claimed in claim 1, wherein the receiving system further comprises conversion means for conversion of returning signals received by the receiving antenna into a digital stream carrying electrical descriptors of targets detected.

4. An HF radar system as claimed in claim 1, wherein the signal processing system comprises a discriminator to provide discrimination of characteristic returns from a target.

5. An HF radar system as claimed in claim 4, wherein the discriminator provides discrimination of the characteristic return from a helicopter.

6. An HF radar system as claimed in claim 1, further comprising means for displaying the processed signals.

7. An HF radar system as claimed in claim 1, wherein the frequency management and sounding system provides information regarding the height of the refracting ionosphere layer above the earth, the area distribution of the layer and the optimum frequencies for the 2-way signal path and controls the transmission frequency at a current optimum frequency.

8. An HF radar system as claimed in claim 1, wherein the frequency management and sounding system comprises the transmitting system, receiving system and signal processing system used on a time-shared basis.

9. An HF radar system as claimed in claim 1, wherein the target area is an annular area having an inner radius of 20 Km approximately and an outer radius of 150 Km approximately.

10. An HF radar system comprising:

a duplexed antenna array, said duplexed antenna array comprising a composite directional transmitting and receiving antenna array connected to a duplexer and configured to transmit a beam in an upward direction and to receive returning signals reflected from a target area returning to the composite transmitting and receiving antenna array via refraction at the ionosphere;

a transmitting system comprising a transmitting device being connected via the duplexer to and arranged to drive the composite directional transmitting and receiving antenna array at frequencies suitable for downward refraction by the ionosphere;

a receiving system connected to the duplexer and being configured to receive returning signals from the target area returning to the receiving antenna array via refraction at the ionosphere;

a signal processing system, the signal processing system comprising a digital data processing system; and a frequency management and ionospheric sounding system comprising a cooperating transmitting system and receiving system sending HF signals to the ionosphere and analysing the returning signals.

\* \* \* \* \*